(12) United States Patent
Elsom (10) Patent No.: US 11,280,439 B2
(45) Date of Patent: Mar. 22, 2022

(54) PIG FOR USE IN A SYSTEM FOR LINING DUCTS

(71) Applicant: Aqualiner Limited, Loughborough (GB)

(72) Inventor: Robin Elsom, Umberleigh (GB)

(73) Assignee: AQUALINER LIMITED, Loughborough (GB)

( * ) Notice: Subject to any disclaimer, the term of this patent is extended or adjusted under 35 U.S.C. 154(b) by 435 days.

(21) Appl. No.: 16/336,458

(22) PCT Filed: Sep. 27, 2017

(86) PCT No.: PCT/GB2017/052887
§ 371 (c)(1),
(2) Date: Mar. 25, 2019

(87) PCT Pub. No.: WO2018/060696
PCT Pub. Date: Apr. 5, 2018

(65) Prior Publication Data
US 2019/0234551 A1    Aug. 1, 2019

(30) Foreign Application Priority Data

Sep. 27, 2016 (GB) ..................................... 1616384

(51) Int. Cl.
*F16L 55/40*        (2006.01)
*B29C 63/00*        (2006.01)
(Continued)

(52) U.S. Cl.
CPC .......... *F16L 55/40* (2013.01); *B29C 63/0069* (2013.01); *B29C 63/34* (2013.01);
(Continued)

(58) Field of Classification Search
CPC ... B29C 63/0069; B29C 63/34; B29C 63/341; F16L 55/26; F16L 55/28; F16L 55/40; F16L 2101/18; F16L 2101/20
See application file for complete search history.

(56) References Cited

U.S. PATENT DOCUMENTS 3,643,280 A    2/1972  Powers
4,741,795 A    5/1988  Grace et al.
(Continued)

FOREIGN PATENT DOCUMENTS

DE    3904524 A1    8/1990
EP    0369998       5/1990
(Continued)

*Primary Examiner* — Philip C Tucker
*Assistant Examiner* — John Blades
(74) *Attorney, Agent, or Firm* — Jason P. Mueller; FisherBroyles, LLP (57) ABSTRACT

The present disclosure relates to a pig which is insertable at least partly within a fabric liner sleeve located in a duct and which is capable of heating the liner sleeve in situ in the duct to melt thermoplastic material of the liner sleeve to form, on subsequent cooling of the melted thermoplastic material, a rigid liner in the duct. The pig comprises: a gas inlet (1008) for receiving pressurised gas; a heating chamber (17) in which the pressurised gas is heated; and a gas outlet (1009) via which pressurised gas heated in the heating chamber (17) is deliverable to the fabric liner sleeve.
The pig comprises a tree diffuser (15) located in the heating chamber (17) via which pressurised gas can be delivered into the heating chamber (17).
The tree diffuser (15) has a plurality of branch pipes (A,B,C) each comprising at least one gas delivery aperture, each branch pipe (A,B,C) extending outwardly from a trunk portion of the tree diffuser (15).

19 Claims, 11 Drawing Sheets

(51) Int. Cl.
*F16L 55/28* (2006.01)
*B29C 63/34* (2006.01)
*F16L 55/165* (2006.01)
*F16L 101/18* (2006.01)
*F16L 101/20* (2006.01)

(52) U.S. Cl.
CPC ........ *B29C 63/341* (2013.01); *F16L 55/1653* (2013.01); *F16L 55/28* (2013.01); *F16L 2101/18* (2013.01); *F16L 2101/20* (2013.01)

(56) References Cited

U.S. PATENT DOCUMENTS

| | | |
|---|---|---|
| 4,781,780 A | 11/1988 | Hannover |
| 5,309,947 A | 5/1994 | Hinger |
| 6,228,312 B1 | 5/2001 | Boyce |
| 7,827,646 B2 | 11/2010 | Pruett |
| 8,281,444 B2 | 10/2012 | Rosen et al. |
| 2004/0036202 A1 | 2/2004 | Weatherby et al. |
| 2007/0275162 A1* | 11/2007 | Kamiyama ......... B29C 63/0069 427/230 |
| 2015/0265980 A1* | 9/2015 | Furuno .................... C02F 3/20 210/151 |
| 2017/0299106 A1 | 10/2017 | Lindelof et al. |

FOREIGN PATENT DOCUMENTS

| | | |
|---|---|---|
| EP | 3336404 A1 | 6/2018 |
| GB | 1366122 | 9/1974 |
| GB | 2571127 A | 8/2019 |
| JP | H01154729 | 6/1989 |
| JP | 2002086564 | 3/2002 |
| WO | 9618493 | 6/1996 |
| WO | 9826919 | 6/1998 |
| WO | 0225156 | 3/2002 |
| WO | 2004090411 | 10/2004 |
| WO | 2019/158950 A1 | 8/2019 |

* cited by examiner

-- Prior Art --

PIG FOR USE IN A SYSTEM FOR LINING DUCTS

CROSS-REFERENCE TO RELATED APPLICATIONS

This application is a national stage entry under 35 U.S.C. 371 of PCT Patent Application No. PCT/GB2017/052887, filed Sep. 27, 2017, which claims priority to Great Britain Patent Application No. 1616384.2, filed Sep. 27, 2016, the entire contents of each of which are incorporated herein by reference.

DETAILS OF THE INVENTION

The present disclosure relates to a pig for use in a system for lining ducts, such as water or sewage pipes or electrical ducts or gas pipes. The pig is insertable at least partly within a fabric liner sleeve located in a duct and is capable of heating the liner sleeve in situ in the duct to melt thermoplastic material of the liner sleeve to subsequently form, on cooling of the melted thermoplastic material, a rigid liner in the duct.

WO98/26919 describes how a pipe, for instance a water pipe or a sewage pipe, can be rehabilitated by the use of a tubular liner which is introduced into the pipe as a fabric sleeve in a collapsed form, and then is expanded into contact with the pipe wall. Next, heat is applied to the liner and the liner is subsequently allowed to cool, whereupon the liner forms a hard and rigid tubular lining for the pipe. The fabric sleeve used in the process comprises a thermoplastic composite interweaved with reinforcing fibres. The thermoplastic material is melted by heating in situ in the pipe and then allowed to harden to form the tubular liner within the pipe. A specially constructed pig is used to apply heat to the sleeve in situ in the pipe to form the liner.

WO02/25156 provides details of a pig which is used to direct hot air through a fabric sleeve of composite material, comprising thermoplastics and fibre reinforcements, in order to melt the thermoplastic material and allow the formation of a hard sleeve in situ in a duct.

WO2004/090411 describes a further variant of pig used in a system for lining ducts. The pig described in the document is designed to force hot gas under pressure through a fabric sleeve comprising thermoplastic material and reinforcing fibres, and the pig has heating means both within and outside the fabric sleeve, to ensure uniform heating of the sleeve.

In order to achieve a practical and useful system of the type described in the prior art, the length of the pig is limited to around 700 mm, or else navigating the pig around a curve in the pipe becomes difficult. This limited length means that there is a limited space available within the pig for heating air to a temperature sufficient to ensure adequate heating of the fabric sleeve and also to ensure uniform melting of the thermoplastic material in the fabric sleeve. It is important not only to ensure that a correct air temperature is reached which will facilitate the melting of the thermoplastic material, but also to ensure that the hot air delivered from the pig is of a uniform temperature. Otherwise there will be cold and hot spots in the fabric sleeve, which will result in the duct liner being incorrectly formed or formed with points of weakness.

The present disclosure provides a pig and a method of using the pig.

Embodiments of the present disclosure will now be described with reference to the accompanying drawings, in which.

Figure 1:
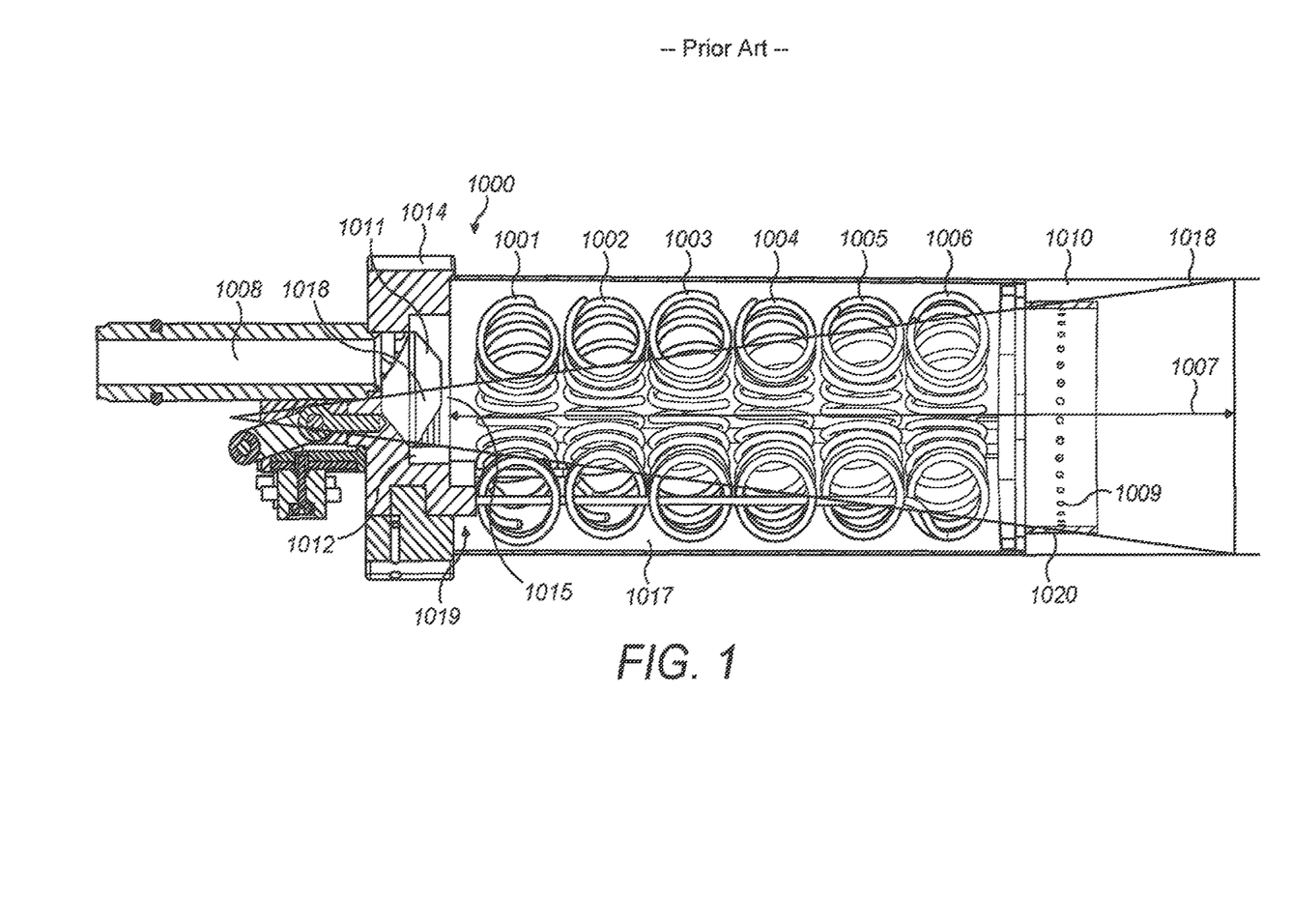
FIG. 1 is a schematic illustration of a pig.

In FIG. 1 there can be seen a pig 1000. The pig 1000 may be used in a method of lining a water or sewage pipe as described in any of WO98/26919, WO2004/090411 or WO2004/090411; in some embodiments, the pig 1000 is designed to heat a liner sleeve of thermoplastic material and reinforcing elements. The pig 1000 can be used to heat a liner sleeve to form a rigid liner in any duct, for instance an electrical duct or a gas pipe as well as a water or sewage pipe.

The pig 1000 is provided with a plurality of annular coiled heating elements 1001 to 1006 all arranged around a common axis 1007. The pig 1000 has a gas inlet 1008 and heated gas leaves the pig 1000 in a radial direction via a series of apertures 1009 in an end ring 1020 of an outlet end 1010 of the pig 1000.

The inlet tube 1008 is radially offset from the axis 1007, and gas delivered by the inlet tube 1008 passes through a first 90° bend 1011 and a second 90° bend 1012, both formed in a passage provided in an end plate 1014 of the pig 1000. The passage delivers the gas to a gas inlet 1015 via which gas is delivered to a cylindrical heating chamber 1017 of the pig 1000, the heating chamber 1017 being the chamber in which the coiled heating elements 1001-1006 are located. The gas inlet 1015 lies on the axis 1007.

The cone 1018 in FIG. 1 illustrates expansion of gas in the heating chamber 1017 as it flows from an inlet end 1019 of the heating chamber to the outlet end 1010 of the heating chamber 1017. The gas does not immediately flow to the inwardly facing cylindrical surface of the chamber 1017 and instead expands only gradually as it moves through the chamber 1017, as illustrated by the cone 1018. This gives a technical problem since the heating effect on the gas provided by the heating elements nearest the inlet end 1019 of the heating chamber 1017, e.g. the coiled elements 1001, 1002, 1003, is greatly reduced. This decreases the efficiency of the heating of the gas in the pig 1000. This is a particular issue since the cylindrical chamber 1017 is constrained in length. The pig 1000 cannot exceed a certain length (e.g. 700 mm) without the pig then becoming difficult to maneuver through a pipeline. Thus it is not possible to solve the problem of heating the gas effectively simply by extending the length of the cylindrical chamber 1017 and adding extra heating elements. Therefore there is a technical problem to be solved in improving the heating of the gas within a cylindrical chamber 1017 of a fixed length. The disclosure addresses this technical problem.

Figure 2A:
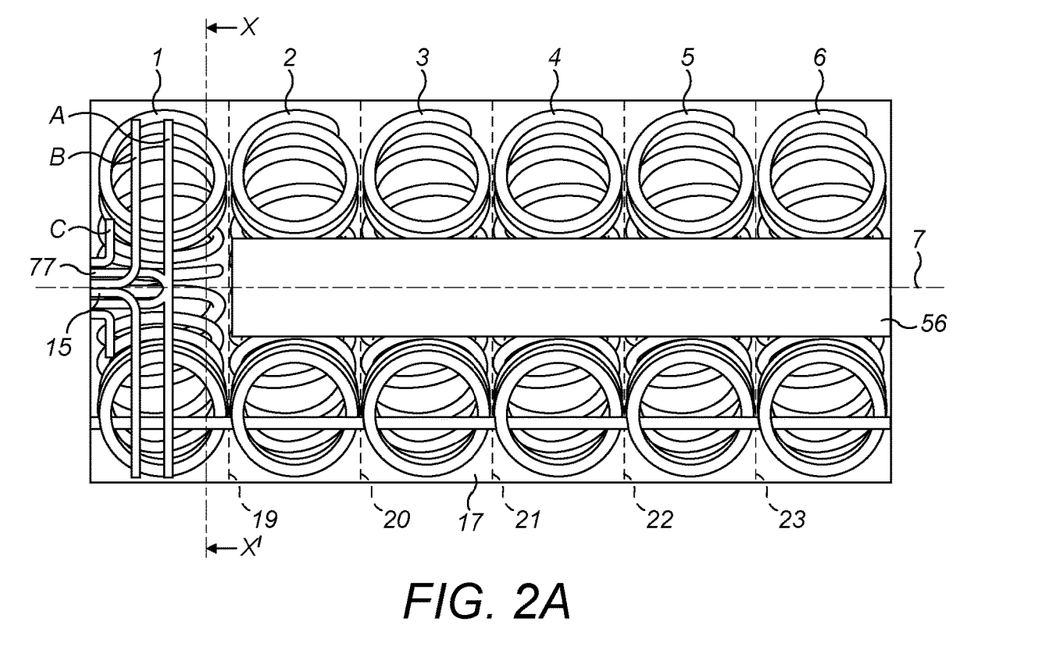
FIGS. 2A and 2B are schematic representations of a pig according to a first embodiment of the present disclosure, with FIG. 2A being a cross section taken along a longitudinal axis of the pig and FIG. 2B being an end view of a part of the pig shown in FIG. 2A.

For simplicity FIG. 2A shows a cylindrical heating chamber 17 of a pig configured according to the disclosure, and does not show the remainder of the pig. The remainder of the pig will be similar to that shown in FIG. 1. For simplicity, only the differences are illustrated by way of FIG. 2A. Related reference numerals are used, e.g. the heating chamber is 17 in FIG. 2A and 1017 in FIG. 1.

In FIG. 2A coiled heating elements 1, 2, 3, 4, 5 and 6 are shown, separated by baffles 19, 20, 21, 22 and 23, which will be described herein. The coiled heating elements 1-6 are arranged around a common axis 7, which is a central axis of the cylindrical heating chamber 17.

Crucially the pig includes a tree diffuser 15 to deliver gas to the heating chamber 17. The tree diffuser 15 comprises three sets of branch pipes: a set of branch pipes A, a set of branch pipes B and a set of branch pipes C. The branch pipes of the sets A, B and C all extend radially out from a central trunk 77. Each branch pipe is connected with or formed integrally with its own trunk portion pipe of identical exterior and lumen diameters. The trunk portion pipes all extend adjacent to neighbouring trunk portion pipes to form the trunk 77 of the tree diffuser 15, as will be described in relation to later figures.

Figure 2B:
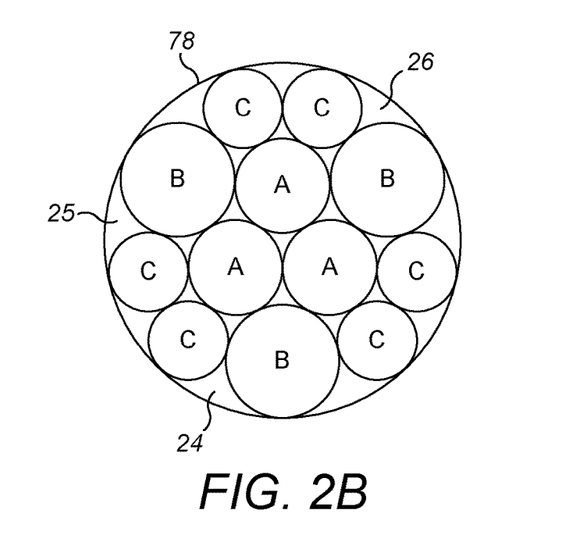

FIG. 2B shows an end face view of an inlet to the tree diffuser 15. The set of branch pipes B comprises three branch pipes, the set of branches A comprises also three branch pipes, and the set of branches C comprises six branch pipes. The trunk portion pipes associated with the branch pipes are shown in FIG. 2B, and they are shown all encased in a circular inlet pipe 78. Each trunk portion pipe is circular in cross section, as can be seen in FIG. 2A, and each branch pipe will be of identical cross section to its associated trunk portion pipe; this is further described herein with reference to FIGS. 11A, 11B, 12A, 12B, 13A and 13B. The cross sectional areas of the lumens of the branch pipes and their associated trunk portion pipes are selected so that: the lumen of each branch pipe of set A carries 7.1% of the gas flow, with the lumens of three branch pipes of set A therefore carrying in total 21.3% of the gas flow; the lumen of each branch pipe of set B receives 10.3% of the air flow, with the lumens of the three branch pipes of set B together carrying 30.9% of the air flow; and the lumen of each branch pipe of set C receiving 4.98% of the gas flow, the six branch pipes of set C therefore carrying approximately 29.9% of the total gas flow. The remainder of the gas flow, approximately 17.9% of the total gas flow, passes through the interstitial gaps defined between the trunk portion pipes of Sets A, B and C and the inlet pipe 78 which encases and surrounds them, such gaps being illustrated for instance as 24, 25 and 26 in FIG. 2A.

The typical outer dimeter for the inlet pipe 78 shown in FIG. 2A will be 25 mm, which means that for the percentage air flows previously given: each branch pipe and associated trunk portion pipe of set A will have a lumen of a diameter of roughly 6.7 mm; each branch pipe and associated trunk portion pipe of set B will have a lumen of a diameter of roughly 8.04 mm; and each branch pipe and associated trunk portion pipe of set C will have a lumen of a diameter of roughly 5.58 mm. The inlet pipe 78 could be of a variety of diameters and then the diameters of the lumens of the pipes of sets A,B and C will vary also, the diameters being set in accordance with the ratios given in the previous paragraph.

Figure 3:
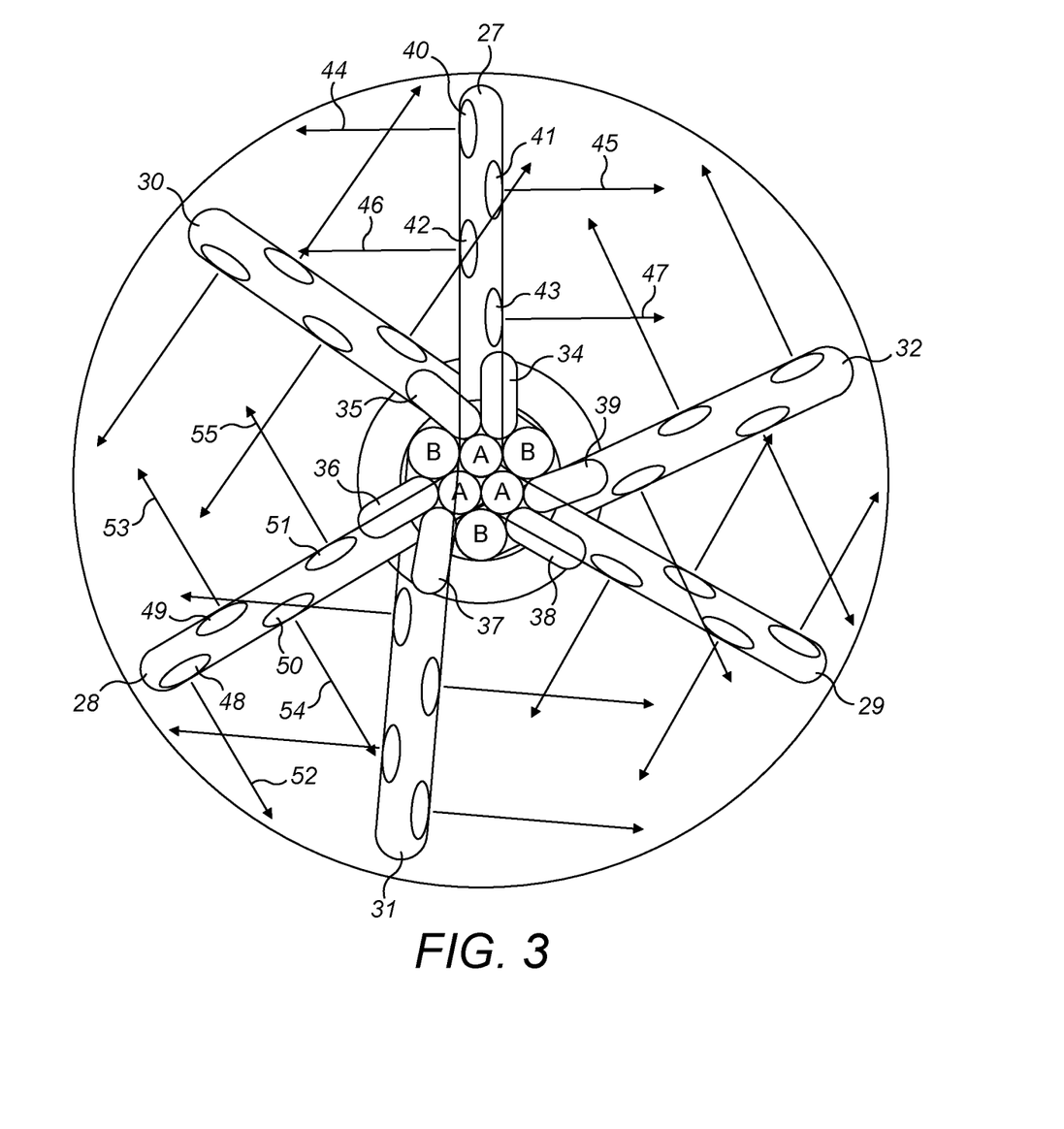
FIG. 3 is a simplified cross sectional view through the pig of FIG. 2B, taken along the line of X-X' of FIG. 2B in the direction of the arrows shown in the Figure.

FIG. 3 shows branch pipes: 27, 28 and 29 of set A; 30, 31 and 32 of set B; and 34, 35, 36, 37, 38, and 39 of set C. When viewed as shown in the Figure, some branch pipes (e.g. the branch pipes of set A) lie below other branch pipes (e.g. the branch pipes of sets B and C) and the underlying branch pipes are shown in the view of FIG. 3 by making the overlying pipes "transparent" to some degree in the figure, although in practice all the pipes will be opaque metal pipes.

Each pipe of set A has at least four apertures, for instance the apertures 40, 41, 42 and 43 of branch pipe 27 are shown in FIG. 3. The arrows 44, 45, 46, and 47 are shown to illustrate the flow of gas respectively from the apertures 40, 41, 42 and 43. The other branch pipes 28 and 29 of set A have similar apertures and arrows are shown in the Figure to show the flow of gas from these apertures.

In FIG. 3 it can be seen that the branch pipe 30 of the set of branch pipes B has apertures 48, 49, 50, and 51 and the arrows 52, 53, 54 and 55 show the flow of gas respectively out of the apertures 48, 49, 50 and 51. The other branch pipes 31 and 32 of the set B will have similar apertures, which for the sake of clarity are not referenced in the drawing, but arrows are given in FIG. 3 to show the direction of flow of gas from each of the apertures.

The branch pipes of Set C, shown as 34-39 in FIG. 3, will each also have an end apertures provided in each of them to allow for the flow of gas out of them, as will be described later. However, for the sake of clarity in FIG. 3 these apertures are not shown, nor are arrows provided to illustrate the gas flow.

In FIG. 3 the arrows clearly show that the use of the tree diffuser 15 provides for the flow of gas across the transverse cross section area of the cylindrical chamber 17. This means that the flow of gas will interact with each of the heating coils 1-6 shown in FIG. 2A. Indeed in FIG. 2A it can be seen that the branch pipes of Sets A, B and C extend between the coils of the coiled heating element 1 and the branch pipes of the Sets A and B extend out the majority of the distance to the inwardly facing surface of the cylindrical chamber 17. In this way the air introduced into the cylindrical chamber 17 by the tree diffuser 15 will flow over each of the coiled heating elements 1 to 6 and be heated thereby, significantly improving the heating efficiency of the pig.

Figure 4:
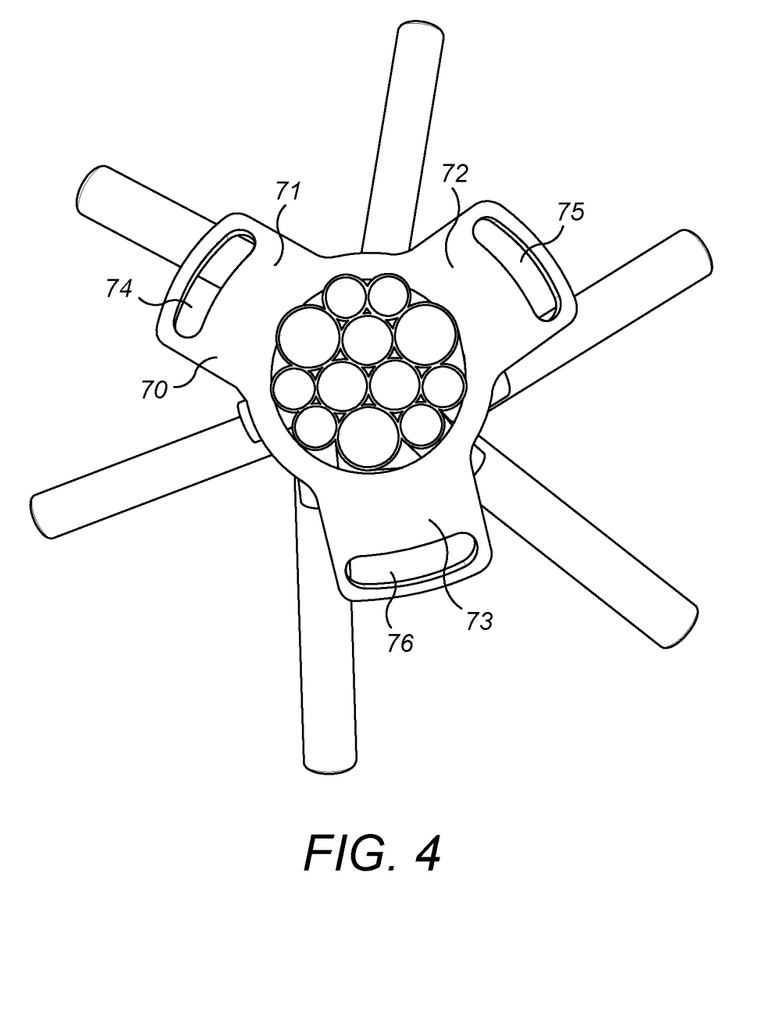
FIG. 4 is a first end view of a tree diffuser of the pig of FIGS. 2A, 2B, and 3.
Figure 5:
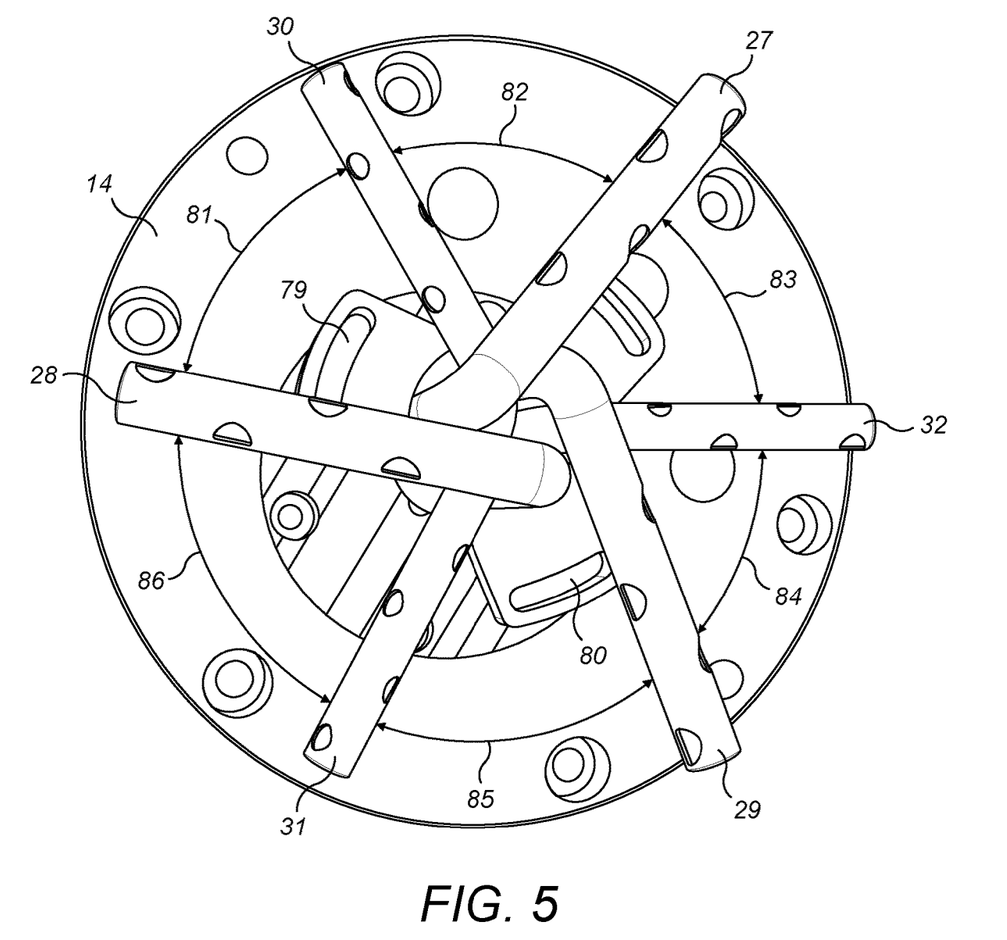
FIG. 5 is a second end view of the opposite side of the tree diffuser to that shown in FIG. 4 secured to an end plate of a pig, such as the pig of FIGS. 2A, 2B, and 3.

The tree diffuser 15 described above in relation to FIGS. 2A, 2B and 3 can be seen in FIGS. 4 and 5 as well as FIGS. 6 to 9. FIG. 4 shows a cover plate 70 which allows attachment of the tree diffuser to the end plate 14 of the pig. The cover plate 70 has three arms 71, 72 and 73, each of which is provided with a slot 74, 75, 76. In FIG. 5 it can be seen that the slots 74, 75 and 76 align with threaded bores e.g. 79, 80 in the end plate 14 of the pig. The cover plate 70 (and thereby the tree diffuser 15) will be secured in place by threaded bolts (not shown) screwed into the threaded bores (e.g. 79, 80) in the end plate 14. The slots 74, 75 and 76 allow the cover plate to be secured in plate in a range of rotational orientations relative to the end plate 14. A clearer view of the cover plate 70 is given in FIG. 10, where the angle 90 is thirty degrees and this indicates that the slots 74, 75 and 76 allow 30 degrees of rotation of the cover plate 70 relative to the adjacent end plate 14.

Figure 6:
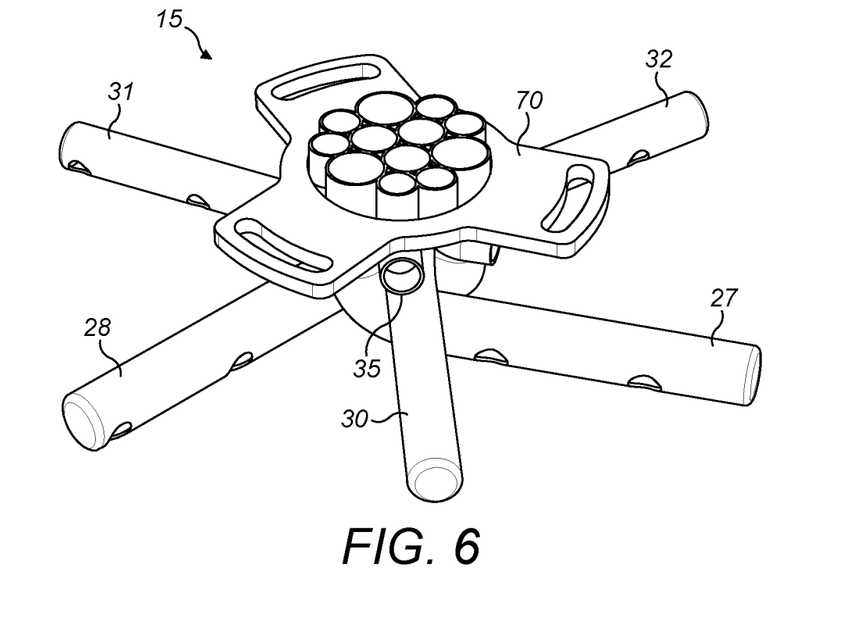
FIG. 6 is a perspective view showing one side of the tree diffuser shown in FIGS. 4 and 5, and shown as part of the pig of FIGS. 2A and 3.
Figure 7:
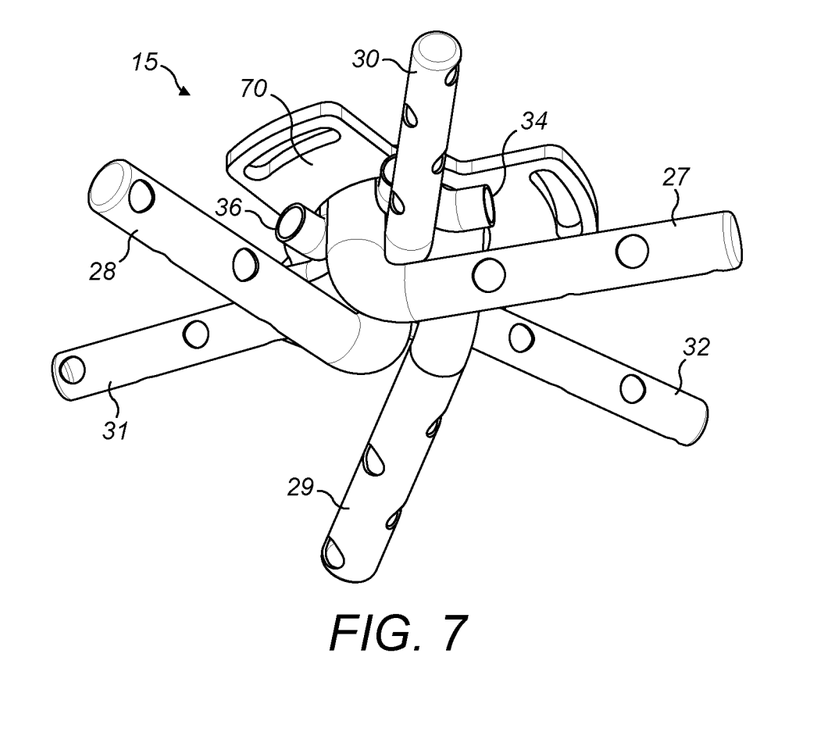
FIG. 7 is a second, different, perspective view of the tree diffuser of FIG. 6.
Figure 8:
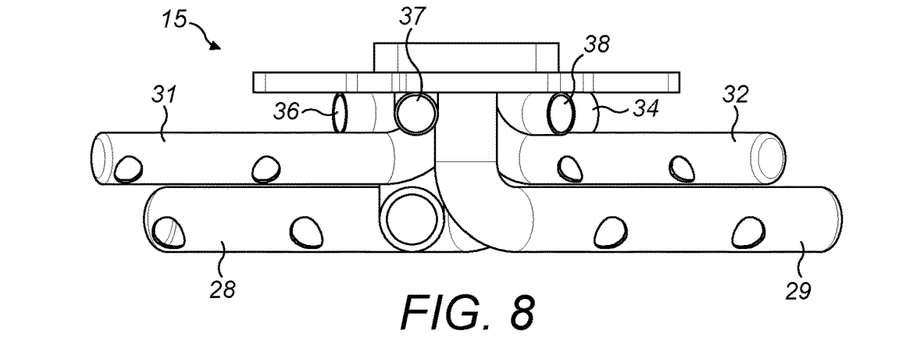
FIG. 8 is a side-on view of the tree diffuser of FIGS. 6 and 7.
Figure 9:
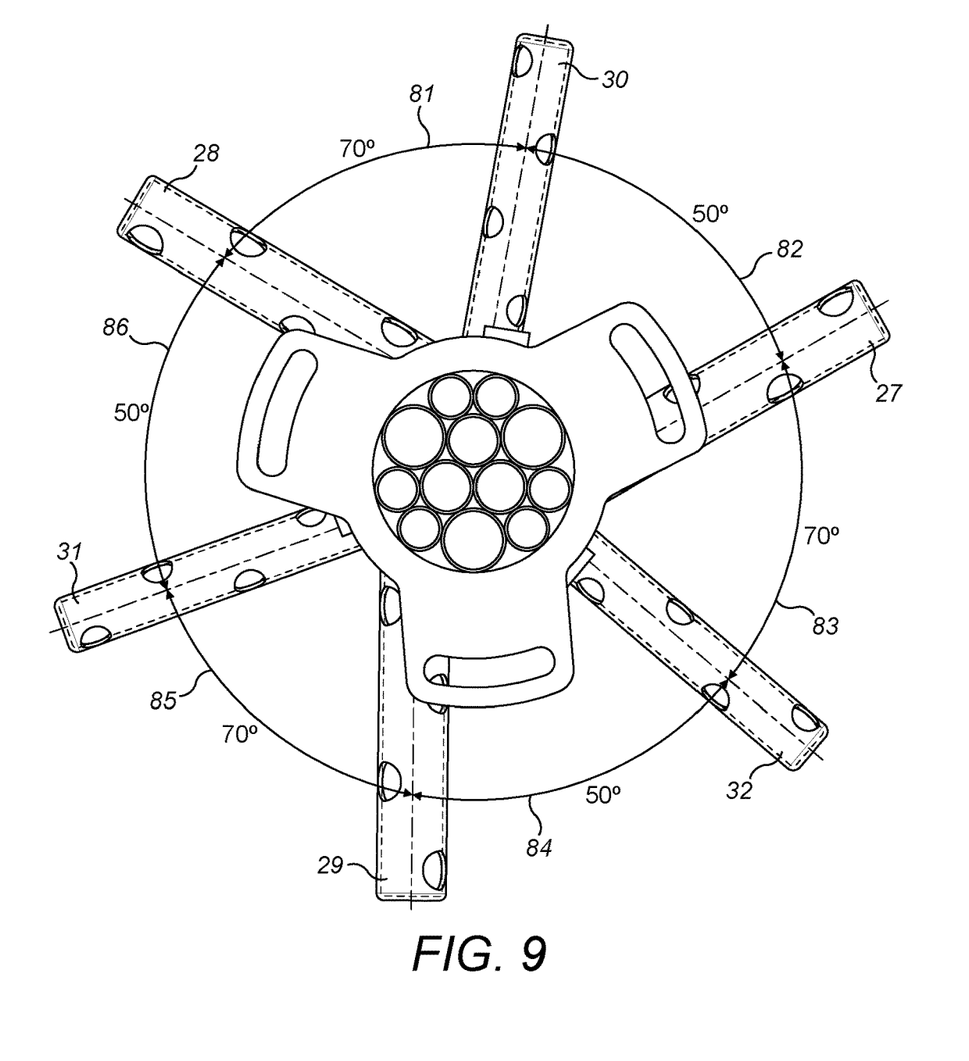
FIG. 9 is an end elevation view of the tree diffuser of FIGS. 6, 7 and 8, with lumens of the branch pipes shown in dotted lines.
Figure 10:
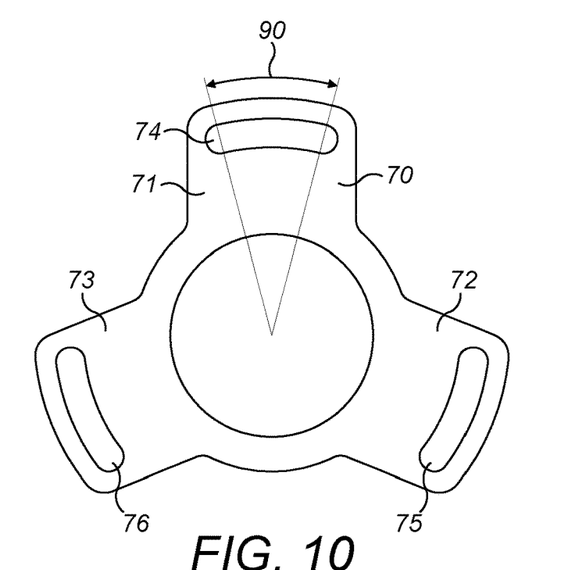
FIG. 10 is a view of a support ring for use with the tree diffuser of FIGS. 6, 7, 8 and 9.

In FIGS. 5, 6 and 7 it can be clearly seen the that the branch pipes 27, 28 and 29 of set A extend over and overlay the underlying branch pipes 30, 31 and 32 of the set B. FIG. 9 shows that this allows the angle 82 between the branch pipe 30 and the branch pipe 27 to be roughly 50 degrees (the angle 82 being the angle between the central axes of the branch pipes at their point of intersection when they are viewed as shown in FIG. 9). Then the angle 83 between the branch pipe 27 and the branch pipe 32 is roughly 70 degrees (the angle 83 being the angle between the central axes of the branch pipes at their point of intersection when they are viewed as shown in FIG. 9). The angle 84 between the branch pipe 32 and the branch pipe 29 is roughly 50 degrees (the angle 84 being the angle between the central axes of the branch pipes at their point of intersection when they are viewed as shown in FIG. 9). The angle 85 between the branch pipe 29 and the branch pipe 31 is roughly 70 degrees (the angle 85 being the angle between the central axes of the branch pipes at their point of intersection when they are viewed as shown in FIG. 9). The angle 86 between the branch pipe 31 and the branch pipe 28 is roughly 50 degrees (the angle 86 being the angle between the central axes of the branch pipes at their point of intersection when they are viewed as shown in FIG. 9). The angle 81 between the branch pipe 28 and the branch pipe 30 is roughly 70 degrees (the angle 81 being the angle between the central axes of the branch pipes at their point of intersection when they are viewed as shown in FIG. 9). The selected angles allow for a good distribution of gas flow around the heating chamber 17 as shown by the arrows in FIG. 3.

The views of the tree diffuser provided in FIGS. 6, 7, 8 and 9 show clearly the branch pipes of the set C. In the Figures, it can be seen that the branch pipes 34, 35, 36, 37 and 38 are all much shorter than the branch pipes of sets A and B and also that they do not have apertures along their lengths, but are instead open at their distal ends, furthest from the trunk 77, and each deliver gas to the heating chamber 17 in a direction coincident with the axis thereof, i.e. a direction radially outwardly from the trunk 77. On the other hand, each of the branch pipes of the sets A and B has a closed end and a plurality of apertures spaced along its length formed in its cylindrical surface.

Figure 13A:
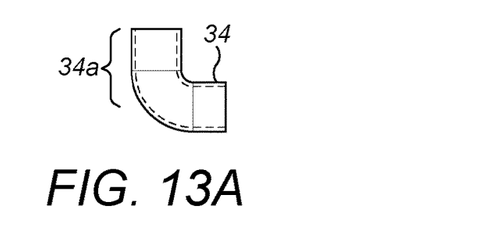
FIG. 13A and FIG. 13B show respectively side and front end elevations of a third branch pipe and associated trunk portion pipe of the tree diffuser of FIGS. 6 to 9.
Figure 13B:
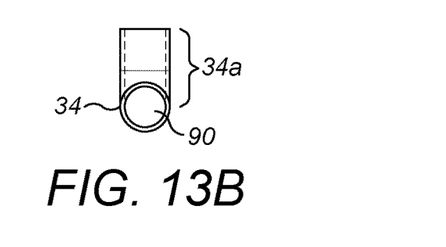

Detailed views of branch pipe 34 of the set C are found in FIGS. 13A and 13B. It can been seen in FIG. 13A that the branch pipe 34 extends at right angles to a trunk portion pipe 34A which is formed integrally therewith. It can be seen in FIG. 13B that the branch pipe 34 is provided with an outlet 90 at the open distal end of the branch pipe 34.

Figure 11A:
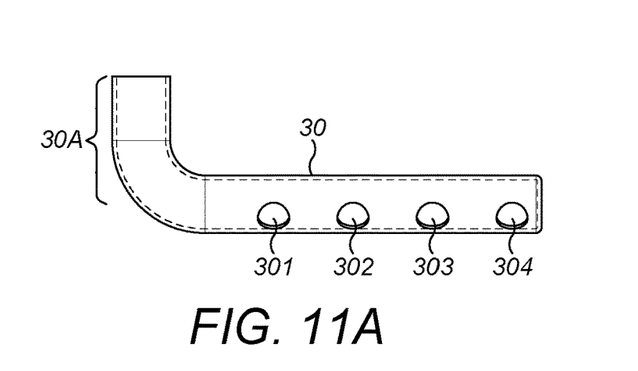
FIG. 11A and FIG. 11B show, respectively, side and front end elevations of a first branch pipe and associated trunk portion pipe of the tree diffuser of FIGS. 6 to 9.
Figure 11B:
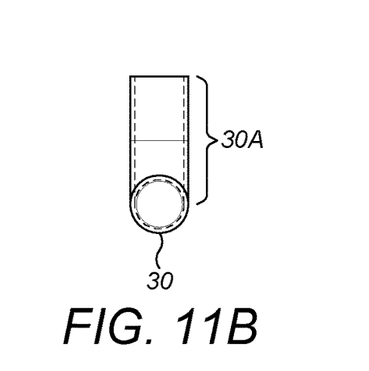

Detailed views of branch pipe 30 of the set B are found in FIGS. 11A and 11B. It can be seen in FIG. 11A that the branch pipe 30 extends at right angles to a trunk portion pipe 30A which is formed integrally therewith. The trunk portion pipe 30A of FIGS. 11A and 11B is significantly longer (preferably at least 50% longer) than the length of the trunk portion pipe 34A of FIGS. 13A and 13B. The branch pipe 30 is significantly longer (preferably at least double in length) than the trunk portion pipe 30A. It can been seen in FIG. 11A that the branch pipe 30 is provided with four apertures 301, 302, 303 and 304 in the cylindrical surface of the branch pipe 30 and spaced along its length, with the aperture 304 located close to the distal end of the branch pipe 30.

Figure 12A:
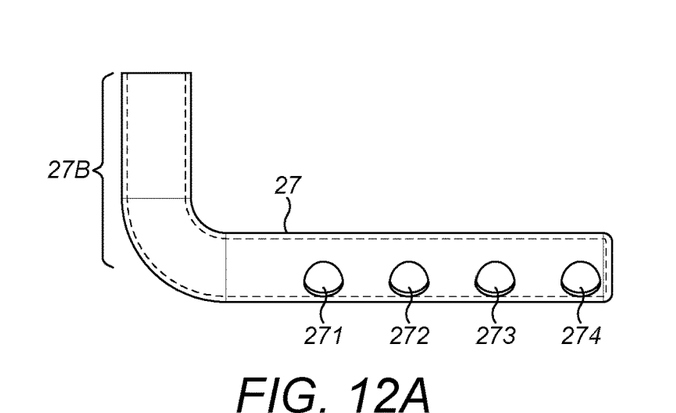
FIG. 12A and FIG. 12B show respectively side and front end elevations of a second branch pipe and associated trunk portion pipe of the tree diffuser of FIGS. 6 to 9.
Figure 12B:
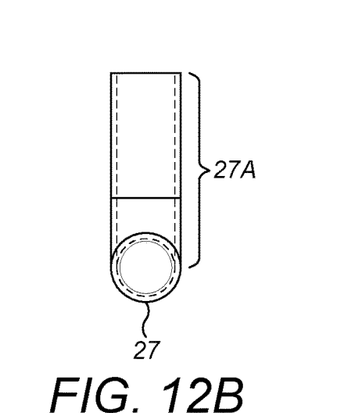

Detailed views of branch pipe 27 of the set A are found in FIGS. 12A and 12B. It can been seen in FIG. 12A that the branch pipe 27 extends at right angles to a trunk portion pipe 27A which is formed integrally therewith. The trunk portion pipe 27A of FIGS. 12A and 12B is significantly longer (preferably at least 50% longer) the length of the trunk portion pipe 30A of FIGS. 11A and 11B. The branch pipe 27 is significantly longer (preferably at least double in length) than the trunk portion pipe 27A. It can been seen in FIG. 12A that the branch pipe 27 is provided with four apertures 271, 272, 273 and 274 in the cylindrical surface of the branch pipe 27 and spaced along its length, with the aperture 274 located close to the distal end of the branch pipe 27.

Figure 14A:
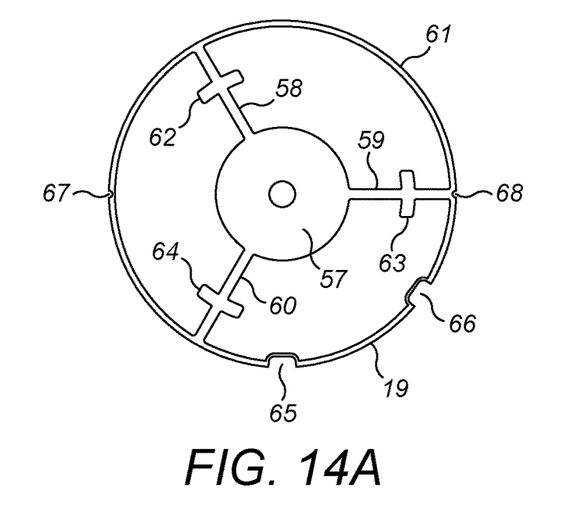
FIGS. 14A to 14J are views of baffles used in the pig of FIGS. 2A and 2B.

The gas flow through the pig and the heating efficiency of the pig are further improved by the use of baffles 19 to 23 and a central core 56 on which the baffles 19 to 23 are mounted and which extends through apertures in the baffles 19 to 23 and through the central apertures of the coiled heating elements 2 to 6 (see FIG. 2A). The central core 56 ensures that the gas flow through the cylindrical chamber 17 passes across the coiled heating elements 2 to 6, rather than passing through their aligned central apertures. The baffles 19 to 23 are shown respectively in FIGS. 14 to 14E, all viewed face on from the inlet side of the heating chamber 17. Each baffle has a central circular land and three arms extending radially out from the central circular land to a circular rim. For instance, the baffle 19 has a central circular land 57 and three arms 58, 59 and 60 which connect the central land 57 to a circular exterior rim 61. Each arm 58, 59 and 60 is cruciform in shape, with a cross bar extending outwardly on both sides at a position approximately two thirds along the length of the arm, beginning at the land. In FIG. 14A the arm 58 has a cross bar 62, the arm 59 has a cross bar 63, and the arm 60 has a cross bar 64.

Also in the FIG. 14A it can also be seen that the rim 61 is provided with notches 65, 66, 67 and 68 which are designed to engage detents provided on the inward facing surface of the cylindrical heating chamber 17 to hold the baffle 19 in place within the heating chamber 17 in a selected orientation.

Figure 14B:
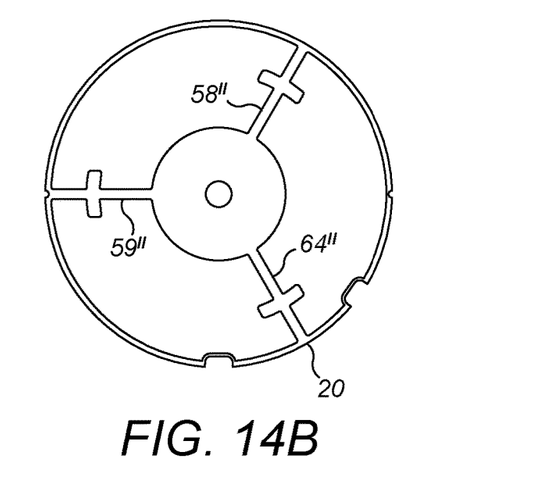
Figure 14C:
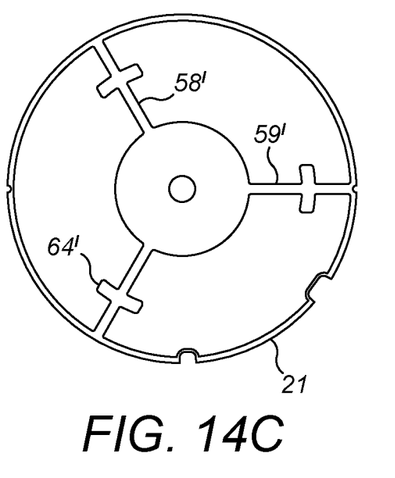
Figure 14D:
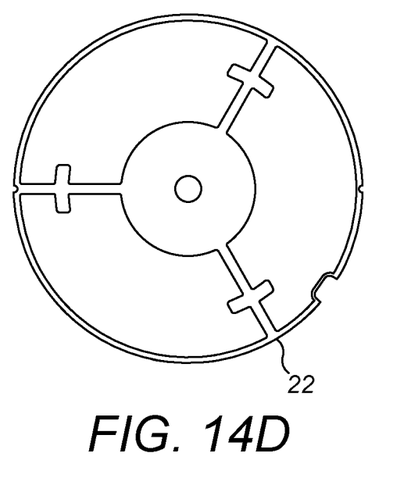
Figure 14E:
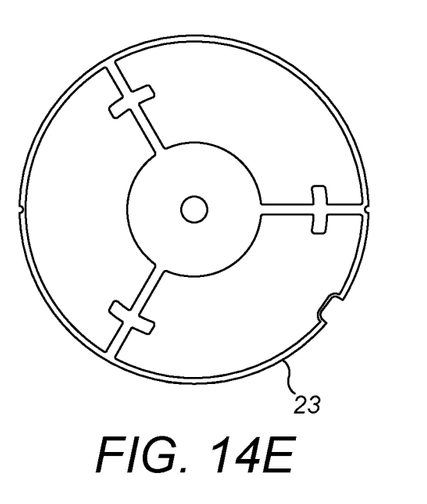
Figure 14F:
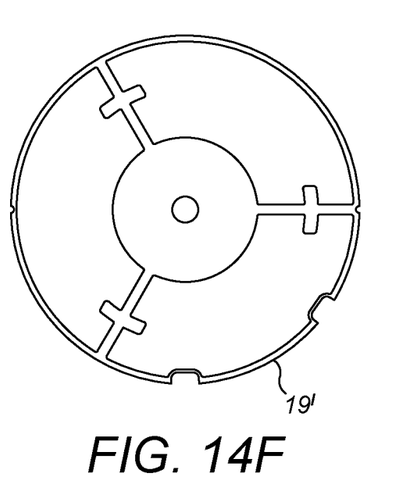
Figure 14G:
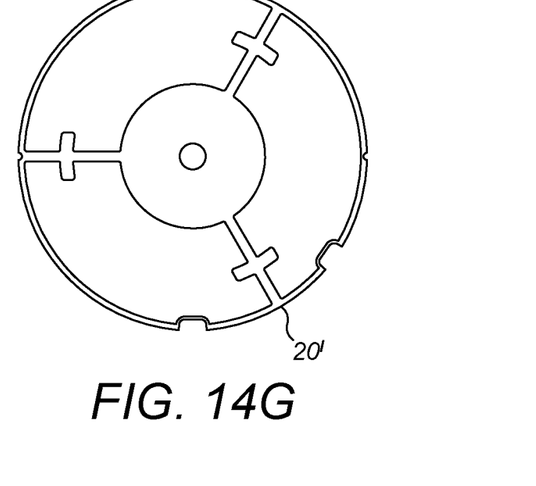
Figure 14H:
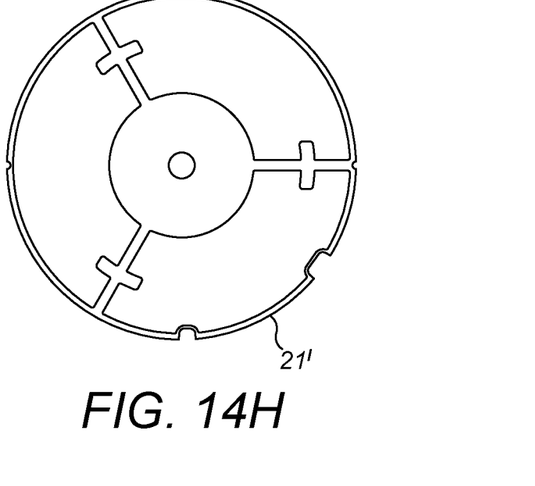
Figure 14I:
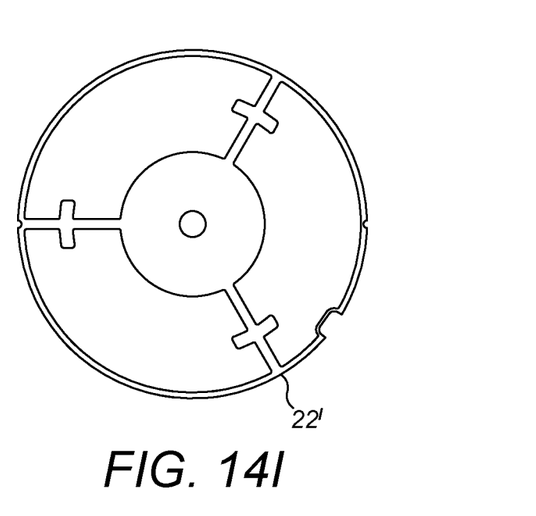
Figure 14J:
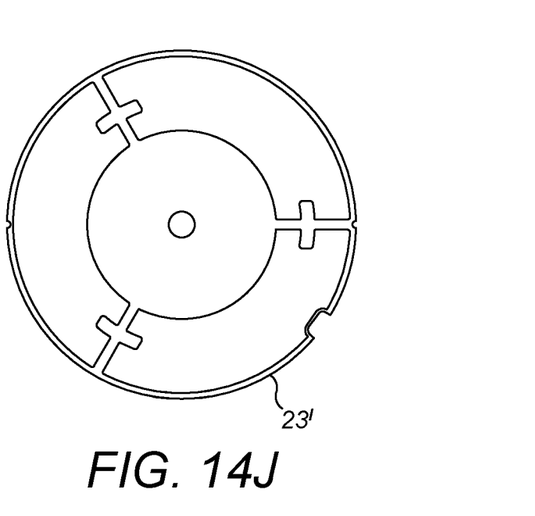

The baffles 20, 21, 22 and 23 have features identical to the baffle 19, but the orientation of the arms of each baffle when secured in place within the cylindrical heating chamber 17 is different to the orientation of the arms of neighbouring baffles. For instance, looking at FIGS. 14A, 14B, and 14C it can be seen that the baffles 19 and 21 of FIGS. 14A and 14C have arms 58 and 58' approximately at the 11 o'clock position, while the arm 58" of the baffle 20 in FIG. 14B is approximately at the 1 o'clock position. In a similar way the arms 59 and 59' of the baffles 19 and 21 are at the 3 o'clock position, whilst the arm 59" of the baffle 20 is at the 9 o'clock position. Furthermore the baffle arms 64 and 64' of the baffles 19 and 21 are at the 7 o'clock position, whilst the arm 64" of the baffle 20 is at the 5 o'clock position.

The configuration of the baffles and their orientation with respect to each other are selected so that the flow of gas along the cylindrical chamber 17 is directed by the baffles across the coils of the coiled heating elements 1-6.

Whereas in FIGS. 14A to 14E the baffles 19-23 are all shown with a central land of a first diameter 57 of 53 mm, alternative baffles 19', 20', 21', 22' and 23' are shown in FIGS. 14F to 14J, with the baffles 19', 20', 21', 22' having a larger central land of a second diameter of 57 mm and the baffle 23' having a much larger central land of a third diameter of 75 mm. This arrangement of baffles 19', 20', 21', 22' and 23' could be used in place of the baffles 19 to 23 in certain situations in order to achieve a different arrangement of gas flow through the cylindrical heating chamber 17. The baffle 23' with the much larger central land could also be used with the baffles 19-22, in place of the baffle 23.

The tree diffuser of the present invention improves the heating efficiency of the coiled heater elements by making sure the pressurized gas flows across the majority of the transverse cross section of the heating chamber 17. Furthermore, the use of a plurality of different branch pipes achieves this effect without constraining the gas flow to such a degree that it becomes supersonic, which would be undesirable for the efficiency of the apparatus. The use of a plurality of branch pipes while also allowing also gas flow through the gaps between the trunk portion pipes and the surrounding heating chamber gas inlet pipe is important in preventing supersonic gas flow. The fact that the gas inflow passes through two ninety degree bends immediately prior (in the sense of the flowstream) to the heated chamber gas inlet pipe means that the gas flow tends to be unbalanced and not uniform and the use of the trunk portion pipes encased and surrounded by the gas inlet pipe tends to advantageously redirect the gas flow to make it more uniform within the heating chamber; the use of the baffles also helps.

The sets of branch pipes A and B described above could be swapped in position so that the slightly longer branch pipes A are sandwiched between the slightly shorter branch pipes B and the more numerous branch pipes C. This might make routing of the pipes easier in some situations.

The invention claimed is:

1. A pig, comprising:
a gas inlet configured to receive pressurized gas;
a heating chamber configured to heat the pressurized gas;
a tree diffuser located in the heating chamber and configured to deliver the pressurized gas into the heating chamber, wherein the tree diffuser includes a plurality of branch pipes each including a gas delivery aperture, each branch pipe extending outwardly from a trunk portion of the tree diffuser, and wherein the pig is configured to be inserted at least partly within a fabric liner sleeve located in a duct;
a gas outlet configured to deliver the heated pressurized gas to the fabric liner sleeve,
wherein the pressurized gas delivered to the fabric liner sleeve heats the liner sleeve in the duct to thereby melt thermoplastic material of the liner sleeve to form, on subsequent cooling of the melted thermoplastic material, a rigid liner in the duct.

2. The pig of claim 1, wherein the branch pipes of the tree diffuser are configured as a plurality of sets of branch pipes,
wherein each pipe in a first set of branch pipes has a first diameter lumen, and each pipe in a second set of branch pipes has a second diameter lumen, and
wherein the second diameter is smaller than the first diameter.

3. The pig of claim 2, wherein the plurality of sets of branch pipes includes a third set of branch pipes, each pipe in the third set of branch pipes having a third diameter lumen that is smaller than the second diameter.

4. The pig of claim 3, wherein the third set of branch pipes includes a number of branch pipes that is greater than a number of branch pipes in each of the first and second sets of branch pipes.

5. The pig of claim 4, wherein:
each branch pipe of the first and second sets includes a closed distal end positioned furthest from the trunk portion of the tree diffuser and a plurality of gas delivery apertures along a length of said each branch pipe of the first and second sets, the apertures configured to deliver the pressurized gas to the heating chamber in a direction perpendicular to a central axis of said each branch pipe of the first and second sets; and
each branch pipe of the third set includes a delivery aperture that is an open end of said each branch pipe of the third set, the delivery aperture configured to deliver the pressurized gas to the heating chamber in a direction aligned with the central axis of said each branch pipe of the third set.

6. The pig of claim 3, wherein:
each branch pipe of the first and second sets includes a closed distal end, positioned furthest from the trunk portion of the tree diffuser, and a plurality of gas delivery apertures along a length of said each branch pipe of the first and second sets, the apertures configured to deliver the pressurized gas to the heating chamber in a direction perpendicular to a central axis of said each branch pipe of the first and second sets; and
each branch pipe of the third set includes a delivery aperture that is an open end of said each branch pipe of the third set, the delivery aperture configured to deliver the pressurized gas to the heating chamber in a direction aligned with the central axis of said each branch pipe of the third set.

7. The pig of claim 1, wherein the heating chamber has a cylindrical shape defining a central axis,
wherein the trunk portion of the tree diffuser is aligned with the central axis, and
wherein the branch pipes extend outwardly in radial directions from the trunk portion.

8. The pig of claim 1, wherein the branch pipes of the tree diffuser are configured as a plurality of sets of branch pipes,
wherein each pipe in a first set of branch pipes has a first diameter lumen, and each pipe in a second set of branch pipes has a second diameter lumen,
wherein the second diameter is smaller than the first diameter;
wherein the heating chamber has a cylindrical shape defining a central axis,
wherein the trunk portion of the tree diffuser is aligned with the central axis,
wherein the branch pipes of the first and second sets extend outwardly in radial directions from the trunk portion, and
wherein the branch pipes of the first and second sets extend toward an inwardly facing cylindrical surface of the heating chamber for a fraction of a distance between the trunk portion of the tree diffuser and the inwardly facing cylindrical surface of the heating chamber.

9. The pig of claim 1, wherein the branch pipes of the tree diffuser are configured as a plurality of sets of branch pipes,
wherein each pipe in a first set of branch pipes has a first diameter lumen, and each pipe in a second set of branch pipes has a second diameter lumen,
wherein the second diameter is smaller than the first diameter,
wherein the plurality of sets of branch pipes includes a third set of branch pipes, each pipe in the third set of branch pipes having a third diameter lumen that is smaller than the second diameter,
wherein the heating chamber has a cylindrical shape defining a central axis,
wherein the trunk portion of the tree diffuser is aligned with the central axis,
wherein all the branch pipes of the tree diffuser extend outwardly in radial directions from the trunk portion, and wherein the branch pipes of the first and second sets extend away from the trunk portion radially further than the branch pipes of the third set.

10. The pig of claim 9, wherein the branch pipes of the first and second sets extend toward an inwardly facing cylindrical surface of the heating chamber for a fraction of a distance between the trunk portion of the tree diffuser and the inwardly facing cylindrical surface of the heating chamber.

11. The pig of claim 1, wherein:
each branch pipe is connected to or integrally formed with one of a plurality of pipes of the trunk portion, each pipe of the trunk portion having a lumen diameter matching a lumen diameter of the associated branch pipe,
the heating chamber further comprises a heating chamber inlet pipe which surrounds and encases all the pipes of the trunk portion,
the heating chamber inlet pipe and the trunk portion pipes therein are connected to the gas inlet, and
the pig is configured to allow gas to flow into the heating chamber via the pipes of the trunk portion and associated branch pipes, and also via passages defined between the pipes of the trunk portion and the heating chamber inlet pipe.

12. The pig of claim 1, wherein the heating chamber further comprises:
a plurality of annular coiled heating elements provided in the heating chamber; and
a plurality of baffles provided in the heating chamber,
wherein each baffle is sandwiched between a pair of neighboring heating coils.

13. The pig of claim 12, wherein at least some branch pipes of the tree diffuser extend between coils of at least one of the coiled annular heating elements.

14. The pig of claim 13, wherein:
each baffle includes a central land, a rim, and a plurality of arms extending from the central land to the rim, and
the baffles are configured so that, when viewed from a gas inlet end of the heating chamber, the arms of neighboring baffles are offset relative to one another.

15. The pig of claim 13, further comprising a core,
wherein the baffles further include aligned apertures centrally positioned in the baffles,
wherein the coiled heating elements further include apertures centrally positioned in the heating elements, and
wherein the core extends through the apertures in the baffles and the core extends through the apertures of each of the coiled heating elements except for a coiled heating element nearest to the gas inlet of the heating chamber.

16. The pig of claim 12, wherein:
each baffle includes a central land, a rim, and a plurality of arms extending from the central land to the rim, and
the baffles are configured so that, when viewed from a gas inlet end of the heating chamber, arms of neighboring baffles are offset relative to one another.

17. The pig of claim 16, further comprising a core,
wherein the baffles further include aligned apertures centrally positioned in the baffles,
wherein the coiled heating elements further include apertures centrally positioned in the heating elements, and
wherein the core extends through the apertures in the baffles and the core extends through the apertures of each of the coiled heating elements except for a coiled heating element nearest to the gas inlet of the heating chamber.

18. The pig of claim 12, further comprising a core,
wherein the baffles further include aligned apertures centrally positioned in the baffles,
wherein the coiled heating elements further include apertures centrally positioned in the heating elements, and
wherein the core extends through the apertures in the baffles and the core extends through the apertures of each of the coiled heating elements except for a coiled heating element nearest to the gas inlet of the heating chamber.

19. A method of lining a duct, the method comprising:
inserting a pig at least partly within a fabric liner sleeve located in the duct,
wherein the pig includes:
a gas inlet configured to receive pressurized gas;
a heating chamber configured to heat the pressurized gas;
a tree diffuser located in the heating chamber and configured to deliver the pressurized gas into the heating chamber, wherein the tree diffuser includes a plurality of branch pipes each including a gas delivery aperture, each branch pipe extending outwardly from a trunk portion of the tree diffuser; and
a gas outlet configured to deliver the heated pressurized gas to the fabric liner sleeve;
delivering pressurized gas to the heating chamber of the pig via the tree diffuser;
heating the pressurized gas in the heating chamber;
delivering the heated pressurized gas via the gas outlet to the liner sleeve in the duct to thereby melt thermoplastic material of the liner sleeve around reinforcing fibers of the liner sleeve; and
cooling the melted thermoplastic material to form, in the duct, a rigid liner including the reinforcing fibers encased in a thermoplastic matrix.

* * * * *